United States Patent
Peltola et al.

[15] 3,683,979
[45] Aug. 15, 1972

[54] TIMBER HARVESTER

[72] Inventors: Waino Peltola, Route 1, Tripoli, Wis. 54561; Ervin W. Braski, Brantwood, Wis. 54513

[22] Filed: July 22, 1970

[21] Appl. No.: 57,281

Related U.S. Application Data

[62] Division of Ser. No. 734,923, June 6, 1968, Pat. No. 3,543,819.

[52] U.S. Cl. .............. 143/32 N, 144/3 D, 144/34 R
[51] Int. Cl. ..................... B27b 17/02, A01g 23/08
[58] Field of Search ........... 144/34 R, 34 E, 3 R, 3 D; 143/32, 32 N

[56] References Cited

UNITED STATES PATENTS

| | | | |
|---|---|---|---|
| 3,461,928 | 8/1969 | Siiro | 144/34 R X |
| 3,260,288 | 7/1966 | Currie | 143/32 R |
| 3,102,562 | 9/1963 | Horncastle | 143/32 N X |
| 3,371,692 | 3/1968 | Larson et al. | 144/34 R |

*Primary Examiner*—Donald R. Schran
*Attorney*—Wheeler, House & Wheeler

[57] ABSTRACT

Disclosed herein is a timber harvester in the form of a vehicle which comprises in unitary assembly, a main frame propelled by endless tracks, a forward boom which supports a timber felling chain saw, a log grapple, a delimber which includes a rotor with an axial throat for receiving felled timber, and four circumferentially arranged cutters that are movable at an acute angle relative to the throat to sever limbs from the felled timer, a feed mechanism for drawing the timber through the delimber, a cut-off saw swingably mounted for movement transverse to the linear feed path to cut the timber into predetermined lengths and a log unloading assembly for palletizing or stacking the cut logs.

5 Claims, 9 Drawing Figures

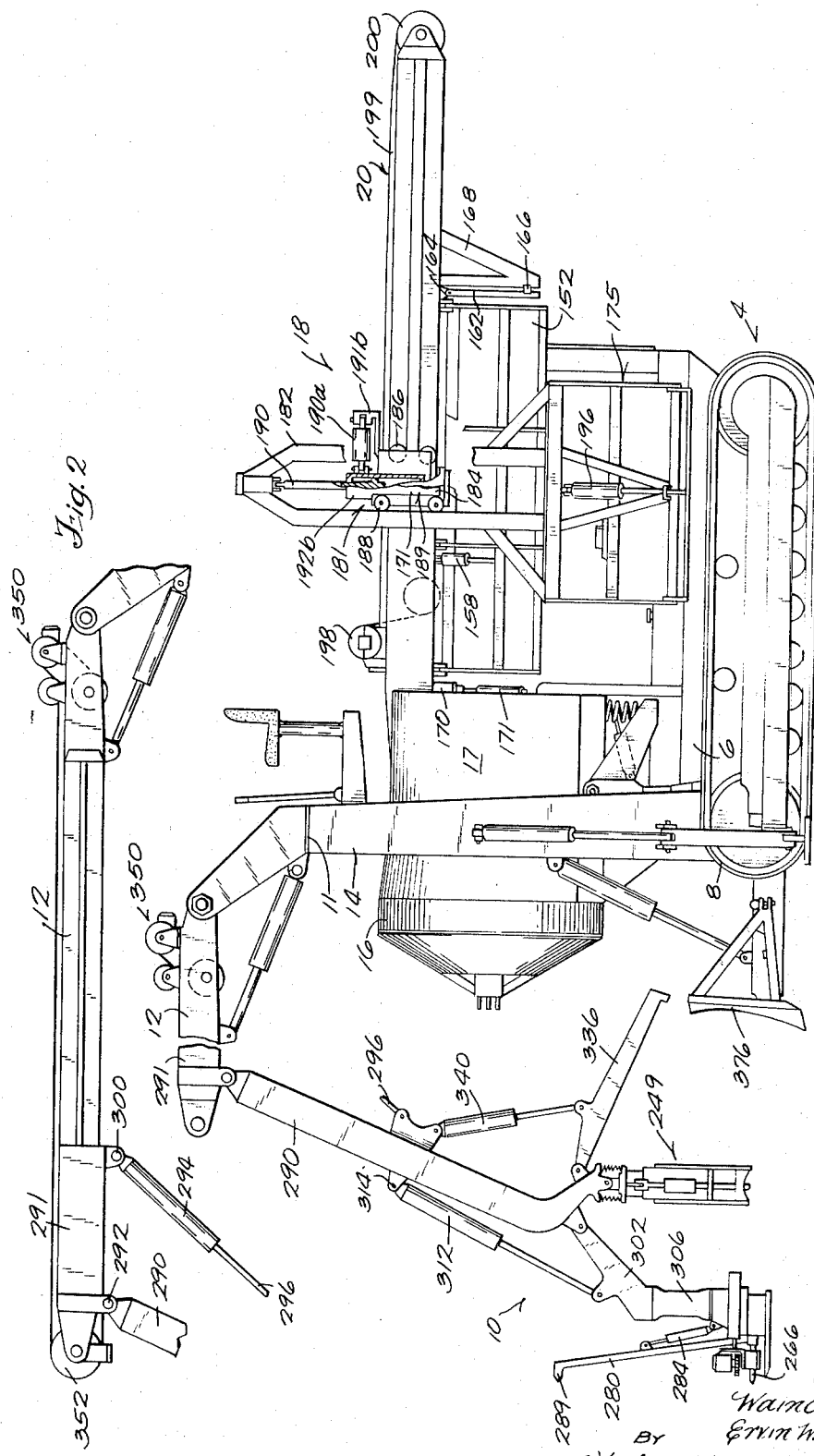

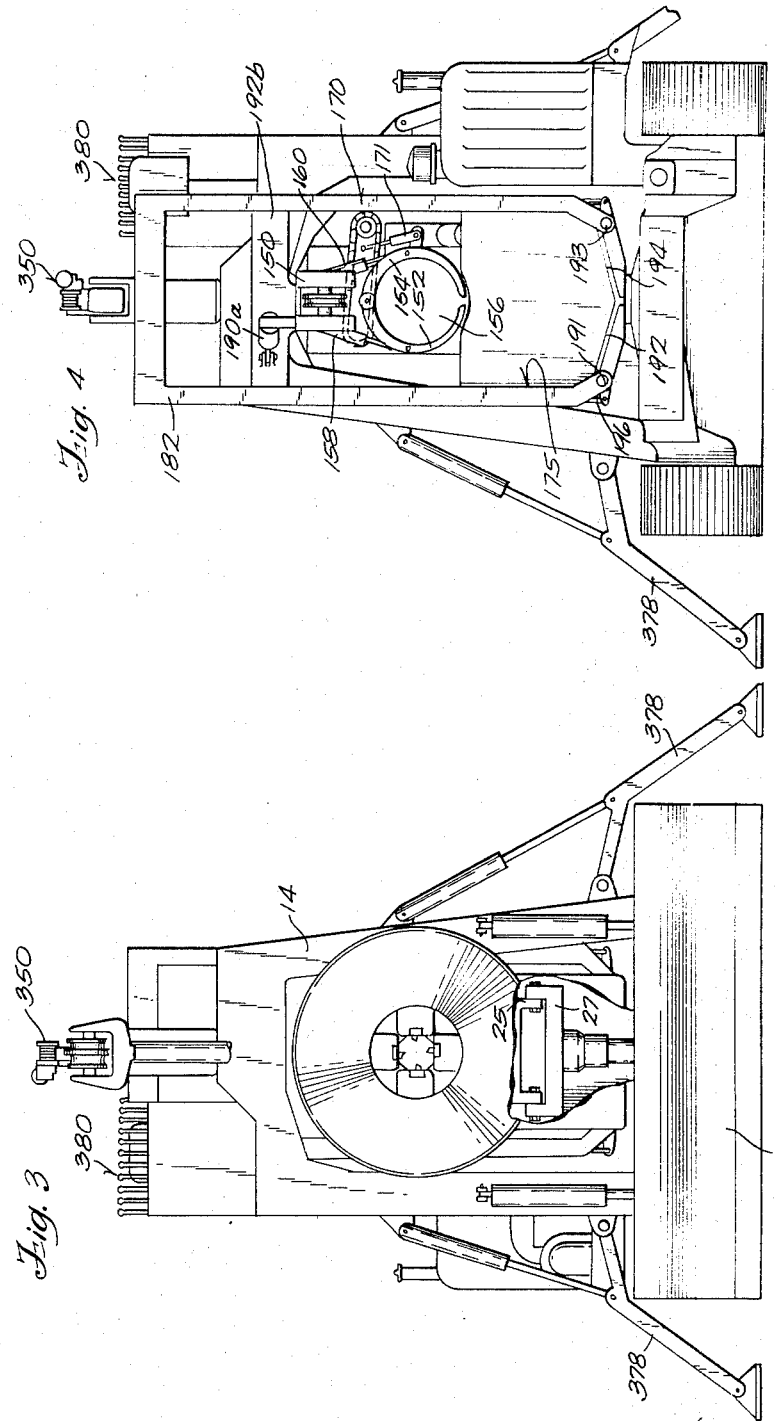

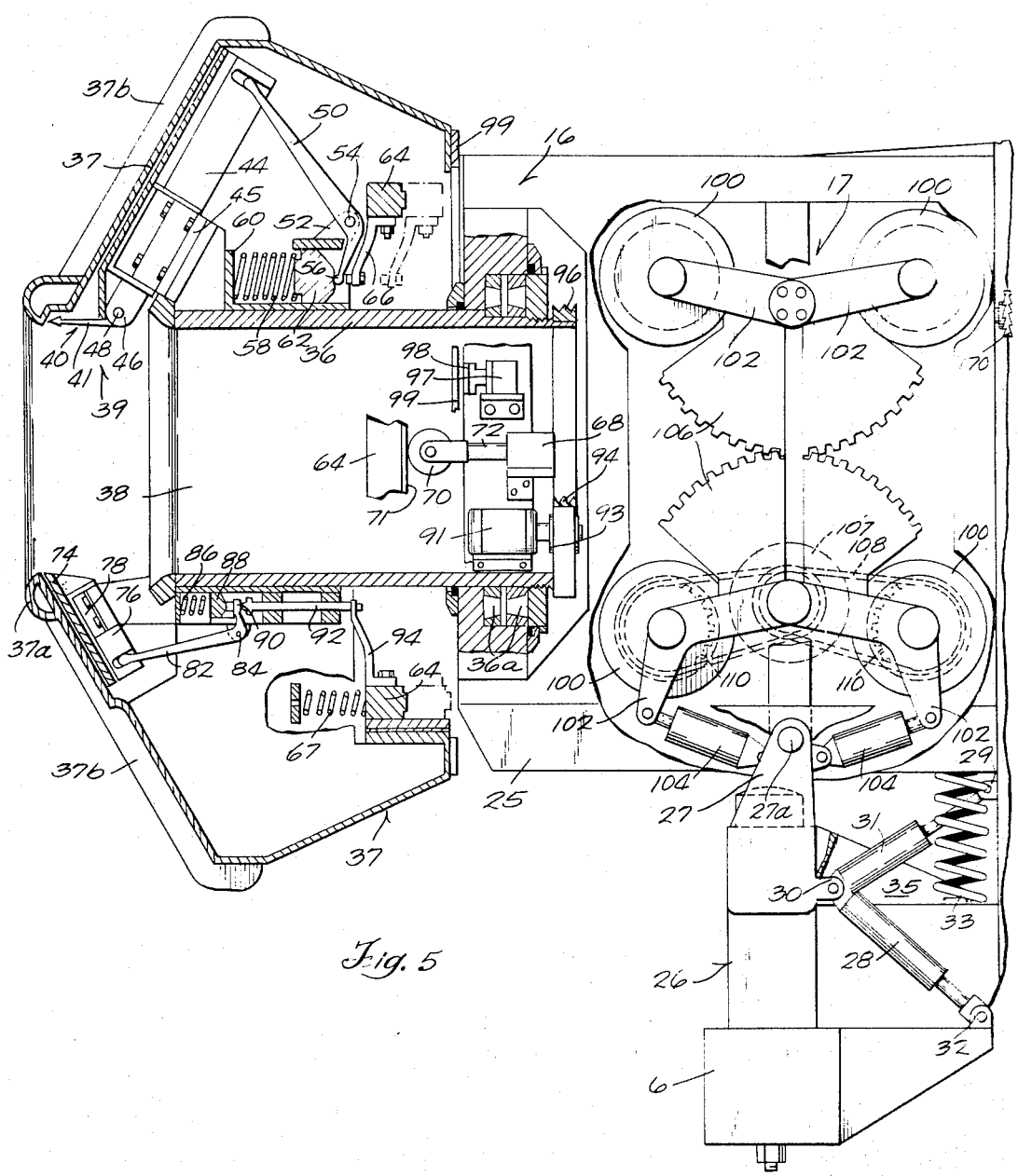

Patented Aug. 15, 1972

Inventors
Waino Pella
Ervin W. Braski
By
Whelan, Whelan, House & Clemency
Attorneys

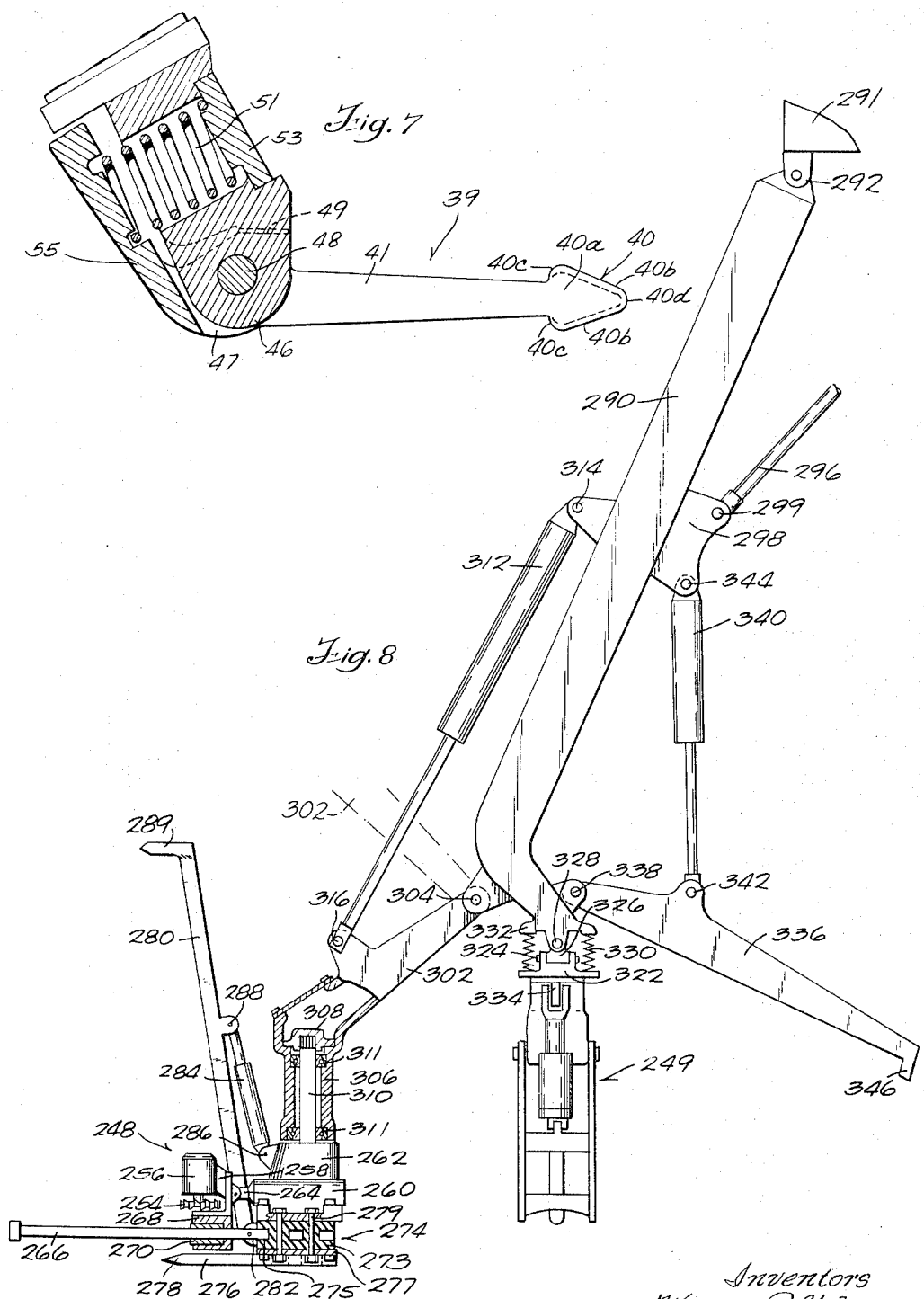

TIMBER HARVESTER

BACKGROUND OF INVENTION

In the harvesting of timber there are two primary harvesting systems, the short wood system and the tree length system. In the short wood system the trees are felled, delimbed, topped, measured and cut to length at the felling site. The logs are subsequently loaded on a drey and skidded to a truck road where theyare loaded on a transport vehicle and transported for further processing. In the tree length system the standing timber is felled, delimbed, topped and skidded from the site as a tree length log and loaded on a transporting vehicle at a truck road. The present invention relates to apparatus for harvesting timber in accordance with the short wood system.

SUMMARY OF INVENTION

The invention provides a timber harvester vehicle adapted to perform the steps of felling, delimbing, cutting to length and stacking the logs. These various steps in the harvesting process are performed by an integrated assembly of apparatus carried on a main frame or chassis which is propelled by endless tracks. The timber harvester vehicle can be operated by a single operator and the various steps performed in sequence by the use of hydraulic controls within reach of the operator.

The apparatus includes a forward boom which supports a saw and grapple assembly. The saw and grapple assembly includes a chain saw which is mounted on a slide and movable to cut standing timber. The saw and grapple assembly also includes a heel boom which is actuated by a power cylinder and is adapted to engage a tree trunk vertically above the kerf and prevent any tilting of the trunk which would tend to pinch the saw cutter bar during the cutting operation. The heel boom is also utilized for directionally felling the timber upon completion of the kerf.

The saw and grapple assembly also includes a grapple which is utilized to lift and move the felled tree and insert the butt end of the trunk into a delimber.

The delimber comprises a rotor with an axial log receiving throat which forms a portion of a linear feet path. The limbs are severed from a felled tree in the delimber by four circumferentially and equally spaced cutter assemblies which are mounted within the delimber and movable at an acute angle relative to the axis of the rotor into the feed path at a point forwardly of the rotor to sever the limbs from the trunk. As the cutters are moved inwardly toward the axis of the rotor, they project forwardly of the throat of the delimber to locate the cutting action forwardly of the rotating rotor and provide clearance between the limbs and the forward portion of the rotor.

Brush plates located on the cutter assemblies screen cut limbs and debris from the throat of the delimber to minimize interference with the cutting operation and movement of the trunk through the delimber. An arrangement of auxilliary brush plates fills the gaps between the brush plates on the cutter assemblies. The auxilliary brush plates are adjustably movable at an angle relative to the rotor axis to cooperate with the brush plates on the cutter assemblies and screen the throat of the delimber and provide a log receiving aperture slightly larger than the diameter of the trunk being delimbed.

The logs are drawn through the delimber by a feed mechanism located aft of the delimber. The feed mechanism comprises four rollers which are movable relative to the feed path and adapted to grip the logs.

A log unloading assembly is provided which includes a log receiving chamber defined by two pivotally suspended arcuate doors. The log receiving chamber is co-axial with the throat of the delimber and forms a portion of the linear feed path. A trunk with the limbs removed is cut into bolts of a predetermined length as the butt end of the trunk engages a stop plate aft of the log receiving chamber and energizes a cut-off chain saw located between the log receiving chamber and the feed mechanism. The bolts or cut logs are discharged from the log receiving chamber into a log accumulator bucket from which the accumulated logs are deposited on a pallet or stacked in a pile on the ground.

One of the primary objectives of the harvester is to reduce the amount of hard physical labor heretofore required in tree harvesting and minimize the damage to saplings.

In forest conservation practice in which selective cutting is employed, only the mature or diseased trees are harvested. In selective logging the short wood system is more desirable than the long wood system because the skidding of tree length logs can cause skinning and breaking of saplings. The timber harvester of the invention is particularly well adapted for use in selective logging because of the mobility afforded by the endless tracks and the unique assembly of apparatus in which a single vehicle can perform all the steps in the harvesting operation.

Further objects and advantages of the present invention will become apparent from the following disclosure.

DRAWINGS

FIG. 1 is a fragmentary side elevational view of a timber harvester in accordance with the invention.

FIG. 2 is a fragmentary side view of the forward boom and trolley assembly.

FIG. 3 is a front elevational view of the timber harvester shown in FIG. 1.

FIG. 4 is a rear elevational view of the timber harvester shown in FIG. 1.

FIG. 5 is an enlarged fragmentary sectional view of the delimber and feed mechanism shown in FIG. 1.

FIG. 7 is an enlarged fragmentary sectional view of a cutter assembly as shown in FIG. 5.

FIG. 8 is an enlarged side view of the saw and grapple assembly shown in FIG. 1.

DETAILED DESCRIPTION

Figure 6:
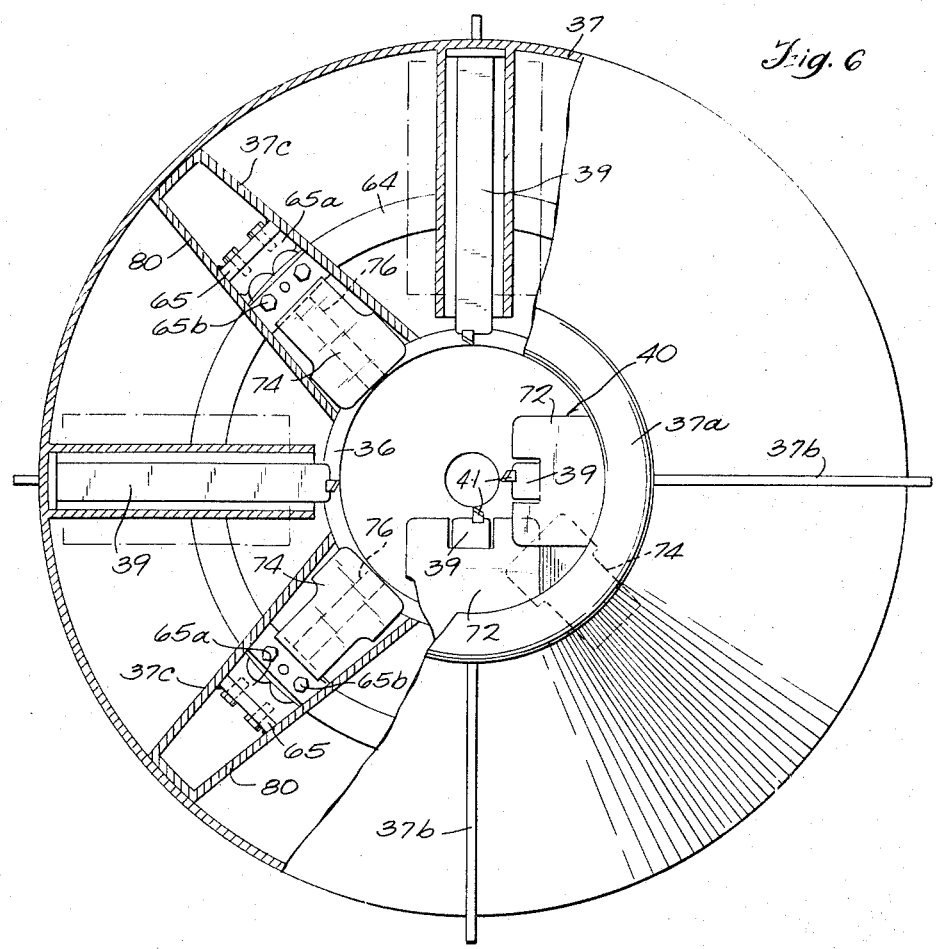
FIG. 6 is an enlarged front view of the delimber shown in FIG. 5 with portions broken away.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

In the drawings, FIG. 1 discloses a timber harvesting vehicle or timber harvester which is generally designated 4 and which includes a main frame or chassis 6 provided with endless tracks 8 to propel the vehicle, a saw and grapple assembly 10 which is carried by a forward boom 12 pivotally connected at 11 to an upstanding A-frame 14 which is integral with the main frame 6. The timber harvester also includes a delimber 16 which rotates within the A-frame 14 and severs branches from cut timber. The timber harvester also includes a feed mechanism 17 for drawing the timber through the delimber, and a log unloading assembly 18 carried by a rear boom 20.

The various assemblies are hereinafter described in detail.

DELIMBER

Referring to FIG. 5, the delimber 16 is supported on a sub-frame 25 which is rotatably supported on the main frame 6 by a king pin assembly 26 which includes an upper yoke 27 pivotally connected to the sub-frame 25 at 27A. Horizontal swinging movement of the delimber 16 and the sub-frame 25 is provided by a power cylinder 28 which extends at an acute angle relative to the longitudinal axis of the timber harvester and which has one end connected at 32 to the frame 6 and the other end universally or pivotally connected at 30 to the king pin assembly 26. Vertical tilt of the sub-frame 25 and the delimber is afforded by a power cylinder 31 having one end connected at 29 to the frame 25 and the other end universally or pivotally connected at 30 to the king pin assembly 26. The sub-frame 25 is yieldably supported by a pair of springs 33 with the upper ends of the springs engaging the sub-frame 25 and the bottoms of the springs 33, supported by outriggers or cantilevered brackets 35 extending from the yoke.

The delimber 16 includes a rotor or drum 36 having a hollow interior or log receiving throat 38 which forms a portion of the linear feed path which extends fore-and-aft of the drum 36. The drum 36 is rotatably supported on the subframe 25 by bearings 36A carried by the sub-frame 25.

The delimber is housed by a one or two piece cowling 37 which has an annular nose ring 37A which forms the entrance to the throat 38 and is adapted to withstand the impact of a log which may engage the nose ring 37A when the log is inserted in the delimber 16. Reinforcing ribs 37B can be circumferentially arranged around the cowling 37. As shown in FIG. 6, the drum 36 is provided with pairs of spaced and radially extending ribs 37C which support the cowling 37 on the drum 36. The cowling 37 can be bolted or otherwise secured to the ribs.

To sever the limbs from the felled timber as the timber is fed into the throat 38 as hereinafter described, the delimber is provided with a plurality of circumferentially spaced cutter assemblies 39 which include cutters 40 at the ends of tool arms 41. In the disclosed construction, there are four cutting assemblies 39 which, as best shown in FIG. 6, are spaced 90 degrees apart.

As shown in FIG. 7, the cutters 40 have a flat forward face 40A located on the side of the cutter 40 which engages the limbs as the delimber rotates, as hereinafter described. The cutters 40 have a top surface 40B which tapers inwardly and rearwardly from face 40A to form a top rake, and a bottom surface 40C which tapers inwardly and rearwardly from face 40A to form a bottom rake. An end surface 40D tapers inwardly and rearwardly to form a back rake. The clearance angles afforded by the various tapers provide maximum cutting action with a minimum of drag or interference by chips, debris and forked trunks, etc.

In accordance with the invention, means are provided for mounting the cutters at an acute angle with respect to the axis of the drum for movement of the cutters into and from the linear feed path at a point spaced forwardly of the drum 36. In the disclosed construction, such means comprises a slide 44 (FIG. 5) which is guided for linear travel by guides 45 mounted on the drum. The guides are aligned in axial planes of the drum 36.

Means are provided for yieldably mounting the tool arms 41 to the slides 44 to afford displacement of the cutters in response to severe loading forces encountered during the delimbing operation. In the disclosed construction the means comprises a yoke 46 at the lower or inner end of the slide 44 (FIGS. 5, 7). A portion 47 of the tool arm 41 is pinned to the yoke 46 by a cross pin 48. Portion 47 is spring biased against a stop 49 by a spring 51 located between a removable plate 53 on the slide and a leg 55 of the tool arm 41 which extends upwardly along the slide.

The means connected to the cutter assemblies 39 which affords movement of the cutting assemblies 39 into the linear feed path, includes an arm 50 (FIG. 5) in the form of a bell crank for each of the cutter assemblies 39. The arm 50 shown in FIG. 5 is pivoted at 54 to a bracket 52 which is integral with the drum 36. The other three arms are similarly connected to the drum 36.

The arms 50 are spring biased by springs 58 located between portions 60 of the brackets 52 and a puck 62 which bears against the ends 56 of the arms 50.

The means for moving the cutting assemblies 39 at an acute angle relative to the axis of the drum includes a clutch ring 64 which is movable axially relative to the drum and supported by a series of spline connections 65 (FIG. 6). As shown in FIG. 6, a spline block 65A is mounted within the pairs of ribs 37C. Spline blocks 65A which project forwardly of the clutch ring 64 interfit with spline blocks 65. The clutch ring 64 is provided with four arms 66 (FIG. 5), one for each slide 44, which are adapted to engage the ends 56 of the arms 50 to cause outward movement of the cutters 42 from the throat 38. The clutch ring 64 is spring biased axially away from the drum by springs 67 (FIG. 5). Movement of the clutch ring axially toward the drum to withdraw or retract the cutter assemblies 39 from the throat 38 and linear feed path is afforded by one or more power cylinders 68 which each have a roller 70 connected to the end of the piston rod 72. The roller 70 bears against the rear face 71 of the clutch ring 64 to move the clutch ring 64 forwardly against the biasing of spring 67 and cause engagement of arms 66 with the ends 56 of the arms 50 and retract the cutter assemblies 39 from the linear feed path.

The hydraulic cylinder 68 is controlled by hydraulic controls, not illustrated, which are located for convenient operation by the vehicle drive. The mounting arrangement of the cutter assemblies in accordance with the invention locates the cutting action of the cutters 40 with the limbs at a point forwardly of the drum 36, thus to provide clearance between the limbs and the forward part of the drum 36.

To prevent cut limbs and debris from entering the throat 38, each cutter slide 44 is provided with a brush plate 72 (FIG. 6) which moves with the cutter 42 into and from the linear feed path forwardly of the drum 36. Each of the brush plates 72 can be offset from the adjacent brush plates 72 so that the brush plates 72 overlap when in an extended position in the linear feed path.

To fill the gaps between the brush plates 72 auxilliary brush plates 74 can be utilized. In the disclosed construction (FIG. 6) four brush plates 74 are circumferentially arranged around the throat of the delimber in the gaps between the cutter assemblies 39. The brush plates 74 are connected to brush plate slides 76 which travel in guide members 78 located between pairs of opposed spaced apart rib walls 80. In accordance with the invention, means are provided for adjustably positioning the brush plates in the throat of the delimber. In the disclosed construction and referring to FIG. 5, the means comprises arms 82 which can be pivotally mounted at 84 to the rib walls.

The auxilliary brush plates 74 are biased to an inwardly extending position in the linear feed path by springs 86 bearing against pucks 88 which engage the ends 90 of the arms 82. The arms 82 are actuated by the clutch ring through a push rod 92 which engages a clutch arm 94. Forward movement of the clutch ring 64 by actuation of the power cylinder 68 causes movement of the arms 82 against the bias of the spring 86 to retract the auxilliary brush plates 74.

The delimber is rotated by a hydraulic motor 91 which has an output shaft provided with dual pulleys 93 which drive belt or belts 94 reeved in pulley flanges 96 at the end of the drum 36.

A brake is provided to stop rotation of the delimber. The brake comprises a hydraulic cylinder 97 mounted on the sub-frame 25. A brake shoe 98 at the end of the piston rod engages a plate 99 at the rear of the cowling 37 when the cylinder 97 is energized.

FEED MECHANISM

As shown in FIG. 5, the timber harvester 4 is provided with a feed mechanism 17 for pulling or moving the logs through the throat of the delimber in the linear feed path. The feed mechanism includes four rollers 100. Each roller 100 is rotatably and swingably supported by two arms 102 which are pivotally connected to the sub-frame 25 which is broken away in FIG. 5. Each roller desirably tapers inwardly from the outer ends toward the roller center to align the logs in the linear feed path.

Means operable by the vehicle operator or driver are provided for moving the rollers inwardly to grip logs of different diameters. In the disclosed construction, the means comprises power cylinders 104 connected to the arms 102. Extension of the cylinder 104 will cause inward movement of the rollers relative to the linear feed path. Sector gears 106 connected to the arms 102 for the lower rollers will cause downward movement of the upper rollers and upward movement of the lower rollers upon actuation of the power cylinders 104. The rollers 100 are rotated or driven by a hydraulic motor 107 drivingly connected to the rollers by chains 108 and sprockets 110. The direction of rotation of the rollers 100 can be reversed to eject a portion of a tree, as for instance, the top of a tree which may be too small in diameter and not suitable for further processing as pulpwood, etc.

LOG UNLOADING ASSEMBLY

The timber harvester is provided with a log unloading assembly 18 which includes the rear boom 20 which is connected at its forward end to the sub-frame 25 and thus is swingable horizontally and tiltable vertically with the sub-frame 25. The log unloading assembly includes a pair of depending doors 152 and 154 (FIGS. 1,4) which are pivotally connected to the boom 20 and define a single log receiving chamber 156 which is coaxial with the drum 36 and which forms a portion of the linear feed path. Means are provided for opening and closing the doors 152 and 154 to discharge a log contained in the log receiving chamber 156. In the disclosed construction, the means is in the form of power cylinders 158 and 160, each cylinder having a piston rod connected to a door and the cylinder connected to the boom 20.

As a log is delimbed and travels through the feed assembly and the log receiving chamber 156, the log engages a stop plate 162 which is pivotally suspended from the rear boom at 164 aft of the log receiving chamber 156. A limit switch 166 mounted in a bracket 168 which depends from the rear boom will energize controls (not shown) to actuate a chain saw 170 which is swingably mounted to the sub-frame 25 for movement transverse to the linear feed path to cut the trunk into sticks or bolts of a predetermined length. The limit switch will also stop rotation of the rollers 100. Movement of the saw is accomplished by actuating a hydraulic cylinder 171 which is connected to the subframe 25 and to the saw 170.

The timber harvester also includes a log accumulator bucket 175 which forms a part of the log unloading assembly 18 and which includes a bucket elevator 181 with an elevator frame 182. The log accumulator bucket is upwardly open to receive logs discharged from the log receiving chamber 156.

Means are provided for mounting the elevator frame 182 on the rear boom 20 to afford longitudinal travel of the elevator frame 182 on the boom and vertical movement of the elevator frame transverse to the boom. In the disclosed construction, such means comprises a trolley frame 184 (FIG. 1) with a set of trolley wheels 186 which bravel on the boom 20 and a set of trolley wheels 188 which travel within the elevator frame 182. Vertical movement of the elevator frame 182 is afforded by a power cylinder 189 having a cylinder 191 secured to the trolley frame 184 and the piston rod 190 connected to the elevator frame 182.

Logs are retained in the log accumulator bucket 175 by two doors 192, 194 which are pivotally connected to the elevator frame 182 at 191 and 193. Means are provided in the form of power cylinders 196 connected to the elevator frame 182 and to the doors 192 and 194 for selectively opening and closing the doors to discharge a pile of logs onto a pallet on the ground.

Horizontal movement of the log accumulator bucket 125 at an angle relative to the linear feed path is afforded by a power cylinder 190A which has one end connected to a bracket 191B which is pivotally connected to the trolley frame 184 and the piston rod pivotally connected to a yoke 192B (FIG. 4). Actuation of the power cylinder 190A permits unloading of logs on a pallet or in a pile adjacent the side of the timber harvester.

Movement of the log accumulator bucket assembly 175 longitudinally of the boom is afforded by a reversible winch 198 which is connected to the sub-frame and which has a winch cable 199 reeved in the pulley 200 at the rear end of the boom 20.

SAW AND LOG GRAPPLE ASSEMBLY

Figure 9:
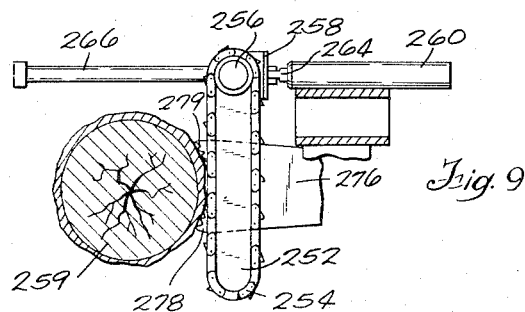
FIG. 9 is a fragmentary top sectional view of the saw and grapple assembly shown in FIG. 8.

In accordance with the invention the timber harvester includes a saw and grapple assembly 10 (FIG. 1, 8) which includes a chain saw 248 and a grapple 249 for cutting standing timber, lifting and carrying the felled timber, and feeding the butt end of the felled timber into the throat of the delimber 16. In addition, the grapple 249 can be used independently of the saw for stacking bolts. Referring to FIG. 8 and 9, there is shown the elastomerically chain saw 248 provided with a cutter bar 252 which movably carries a cutting chain 254. The cutting chain 254 is driven by a hydraulic motor 256. The motor 256 and cutter bar 252 are supported on a saw bracket 258.

Means are provided for moving the saw bracket 258 and the cutter bar 252 in a linear cutting path to cut a tree trunk 259. In the disclosed construction the means comprises a power cylinder 260 which has its cylinder connected to a carrier frame 262 and a piston rod 264 connected to the bracket 258.

Means are provided to guide the cutter bar in the linear cutting path. The means are in the form of a guide rod 266 and a sleeve 268 integral with the saw bracket 258 and a bushing 270 located in the sleeve 268. The guide rod 266 is beneath and in the same vertical plane as the piston rod 264. The sleeve 268 travels over the guide rod 266 during extension of the power cylinder to feed the cutter bar and cutting chain in a linear cutting path through the tree trunk 259. The guide rod 266 is elastomorically and resiliently mounted at 274 to the carrier frame 262 by a neoprene insert 273 with an aperture 275 which receives the end of the guide rod 266. The neoprene insert 273 is sandwiched between plate 277 and carrier frame 262 and secured by bolts 279.

The carrier frame is also provided with a spike bar 276 which can have a forked or Y-shaped forward end 278 with teeth 279 adapted to engage a tree trunk to provide stability for the saw bar 252 during the cutting operation.

The saw and grapple assembly 10 also includes a heel boom 280 which is pivotally connected at 282 to the carrier frame 262 and is provided with a power cylinder 284 having one connected to the carrier frame 262 at 286 and a piston rod connected to the heel boom 280 intermediate the length of the boom at 288. The heel boom 280 is utilized to tilt the tree trunk or prevent tilting of the trunk which would tend to close the kerf during the cutting operation and pinch the cutter bar 252. The heel boom 280 also can be utilized to push or fell the tree in the desired direction after the tree trunk has been partially cut. Heel boom 280 is desirably provided with a Y-shaped tip 289 similar to the forward end 278 of the spike bar.

Means are provided for mounting the carrier frame 262 to the forward boom 12 for movement of the carrier frame about first and second horizontal axes and for manipulation of the saw 248 into a cutting position and for manipulation of the grapple 249 during use. In the disclosed construction, the means includes a saw and grapple boom 290 which has its upper end pivotally connected to a trolley 291 which rides on the forward boom at 292. Vertical swinging movement of the boom 290 relative to the forward boom 12 is provided by a power cylinder 294 having a piston rod 296 connected at 299 to a bracket 298 extending from the boom 290. As shown in FIG. 2, the power cylinder 294 is pivotally connected at 300 to the trolley 291 at a point spaced from connection 292. The saw and grapple boom 290 is connected to the saw carrier frame 262 by an arm 302 which has one end pivotally connected so the boom 290 at 304 to afford movement of the saw 248 about a second horizontal axis. The arm 302 has a lower end formed into a spindle housing 306.

Means are provided for rotatably mounting the carrier frame 262 for movement about a generally vertical axis. The means are in the form of a rotary hydraulic cylinder 308 which is located within the spindle housing 306. The rotary hydraulic cylinder 308 drives the spindle 310 which is connected to the carrier frame 262. Spindle 310 is rotatably supported within the housing by bearings 311.

Means are provided in the form of a hydraulic cylinder 312 to afford vertical swinging movement of the arm 302 about the horizontal axis provided by pivotal connection 304, to elevate or lower the saw 248. The cylinder 312 is pivotally connected to the saw and grapple boom 290 at 314 and is pivotally connected to the arm 302 at 316.

The saw and grapple boom 290 also supports the log grapple 249. The grapple 249 is connected to the boom 290 by an arrangement which includes a mounting bracket 322 which is pivotally supported by trunnions 324 which extend from a mounting member 326 which is pivotally connected to the boom 290 by a cross pin 328. Stabilizer springs 330 located between the mounting bracket 322 and a portion of the boom 332 yieldably support the mounting bracket 322. Means are provided for connecting the grapple to the mounting bracket 322 to rotate or turn the grapple relative to the bracket 322. The means are in the form of a rotary hydraulic cylinder 334 which is mounted within the grapple and which has an output shaft connected to the mounting bracket 322.

A heel boom 336 is provided to assist in guiding the felled tree in a generally horizontal position while it is carried by a grapple 249 and inserted into the throat 38 of the delimber. The heel boom 336 is pivotally connected at 338 to the boom 290. The cylinder 340 is pivotally connected to the saw and grapple boom 290 at 344. The end of the boom 336 is provided with a forked end 346, similar to end 278 of the spike bar 276, which prevents lateral displacement of the log from the linear feed path.

The trolley 291 and the saw and grapple assembly 10 are movable longitudinally along the forward boom 12 by a conventional cable and winch arrangement 350 which includes a pulley 352 located at the forward end of the boom 12.

OPERATION

In operation, the timber harvester is driven to the site and the forward boom 12 and saw and grapple boom 290 are manipulated into an appropriate position for felling a tree. The cutter bar 252 is aligned in a generally horizontal plane by actuation of cylinder 312. The spike bar 276 can be moved into engagement with the trunk my movement of the trolley 291 along the forward boom or moving boom 290 relative to the forward boom 20. The cutting chain 254 is then driven by, energizing saw motor 256. Movement of the cutter bar 252 in a linear cutting path into engagement with the trunk of a tree, as shown in FIG. 9, is accomplished by energizing the cylinder 260.

Prior to or during the cutting operation, the heel boom 280 is moved into engagement with the trunk by energizing the cylinder 284. Directional felling of the standing tree is accomplished by energizing rotary cylinder 308 to position the boom 280 for swinging movement in the desired plane.

Upon felling the tree, the saw and grapple boom 290 is manipulated for engagement with the felled tree at a point intermediate its length and spaced from the butt end of the trunk a sufficient distance to permit engagement of the heel boom 336 with the trunk. The tree is then manipulated into a generally horizontal position by cooperation of boom 290 and heel boom 336 for coaxial alignment with the linear feed path. The trunk is moved toward the delimber by actuating the winch 350 to move the trolley 291 toward the delimber. The cutter assemblies 39 can be retracted from an inward position in the throat to permit insertion of the trunk. The trunk is then extended into the throat of the delimber and the cutting assemblies 39 adjusted to the desired position by energizing hydraulic cylinder 68. As the trunk is extended through the throat of the delimber, the feed mechanism is actuated by the operator with the food rollers 100 brought into engagement with the trunk. As the feed mechanism takes over the feeding operation of the trunk through the delimber, the grapple can be released from the trunk.

During the delimbing operation, the face 40A of the cutters is rotated into engagement with the limbs by energizing the motor 91 to rotate the drum 36. In the disclosed construction the drum 36 rotates in a clockwise direction when viewed from the front, in the FIG. 6 view.

Continued movement of the trunk along the linear feed path through the log receiving chamber 156 will result in the butt end engaging stop plate 162 and energizing limit switch 168 to stop rotation of the rollers and cause the cut-off chain 170 to swing into the linear feed path and cut the trunk at a predetermined length. During the cut-off operation, the trunk is supported by doors 152 and 154. The length of the bolt or cut log can be varied by adjusting the position of the stop plate 162 longitudinally of the rear boom 20. The cut log or bolt can then be dropped into the log accumulator bucket 175 when the log accumulator bucket 175 is positioned beneath the log receiving chamber 156, by opening the doors 152 and 154 by energizing the cylinders 158 and 160. Upon filling the log accumulator bucket 175, the bucket can be moved longitudinally of the rear boom 20 by energizing the winch 198 to thus position the log accumulator bucket 175 in the desired place for depositing the logs on a pallet, truck or the ground. The delimbing and cutting of a trunk into predetermined lengths is continued until the tree top reaches the delimber 16. The tree top can then be ejected by reversing the direction of rotation of the feed rollers to discharge the tree top forwardly of the delimber 16.

The timber harvester can be provided with a bulldozer blade 376 at the forward end (FIG. 1). The bulldozer blade is used for leveling trails, felling sites and landings. The timber harvester can also be provided with two stabilizers 378 (FIG. 3) to afford lateral support when the forward and rear booms are in use at an angle relative to the longitudinal axis of the timber harvester. The stabilizers also are utilized when the terrain of the harvesting site is uneven and the timber harvester cannot be operated on a horizontal surface.

The details of the hydraulic circuits which control the various hydraulic cylinders are not illustrated in detail because they form no part of the present invention. However, the hydraulic circuits are desirably controlled by a valve bank 380 within reach of the operator.

Various of the features of the invention are set forth in the following claims.

We claim:

1. A timber harvester vehicle comprising a vehicle chassis, a forward boom mounted on said chassis, a saw carrier frame, means for mounting said carrier frame on said forward boom to afford vertical swinging movement of said carrier frame about a first horizontal axis, means for mounting said carrier frame to said forward boom for vertical swinging movement about a second horizontal axis, means for turning said carrier frame about a generally vertical axis, a saw bracket, a cutter bar mounted on said saw bracket, a cutter chain carried by said cutter bar, a motor mounted on said saw bracket, said motor having an output shaft in driving engagement with said saw chain, means for mounting said saw bracket on said carrier frame to afford movement of said cutter bar in a linear cutting path, a guide member resiliently and elastomerically mounted on and cantilevered from said carrier frame and extending from said carrier frame and a sleeve on said saw bracket reciprocable on said guide member to guide linear movement of said cutter bar, and a spike bar mounted on said carrier frame adapted to engage a tree trunk.

2. The timber harvester of claim 1, wherein said means for mounting said saw bracket on said carrier frame to afford movement of said cutter bar in a linear cutting path comprises a power cylinder with said cylinder connected to said carrier frame and said piston connected to said saw bracket.

3. The device of claim 1 wherein said means for mounting said carrier frame on said forward boom for movement about a first horizontal axis comprises a saw boom having an upper end pivotally connected to said forward boom, and a power cylinder, said cylinder having a piston rod pivotally connected to said saw boom intermediate its length, said cylinder being pivotally connected to said said forward boom at a point spaced from the pivotal connection of said saw boom to said forward boom, and wherein said means connecting said carrier frame to said forward boom for movement about a second horizontal axis comprises an arm with one end of said arm being pivotally connected to said saw boom and the other end of said arm connected to said carrier frame, and a power cylinder pivotally connected to said arm and pivotally connected to said saw boom.

4. A timber harvester vehicle comprising a vehicle chassis, boom means connected to said chassis, a saw carrier frame, a saw bracket, a cutter bar mounted on said saw bracket, a cutter chain carried by said cutter bar, a motor mounted on said saw bracket, said motor having an output shaft in driving engagement with said saw chain, means for mounting said saw bracket on said carrier frame to afford movement of said cutter bar in a cutting path, and means for mounting said carrier frame on said boom means for turning movement of said carrier frame about a generally vertical axis, said means comprising a housing connected to said boom means, a rotary hydraulic cylinder supported by said housing, said cylinder having an output shaft connected to said carrier frame to support said carrier bracket and to turn said carrier frame about a generally vertical axis.

5. A timber harvester in accordance with claim 1 including a heel boom for directional felling of trees, said heel boom having one end pivotally connected to said carrier frame and a free end adapted to engage a tree trunk, and a hydraulic cylinder for moving said boom about said pivot, said cylinder having one end pivotally connected to said carrier bracket at a point spaced from said connection of said heel boom to said carrier frame and the other end of said power cylinder being pivotally connected to said heel boom at a point intermediate the length of said heel boom.

* * * * *